M. E. SMITH.
COTTON BOLL HARVESTER.
APPLICATION FILED FEB. 14, 1917.
1,237,832.
Patented Aug. 21, 1917.
6 SHEETS—SHEET 1.
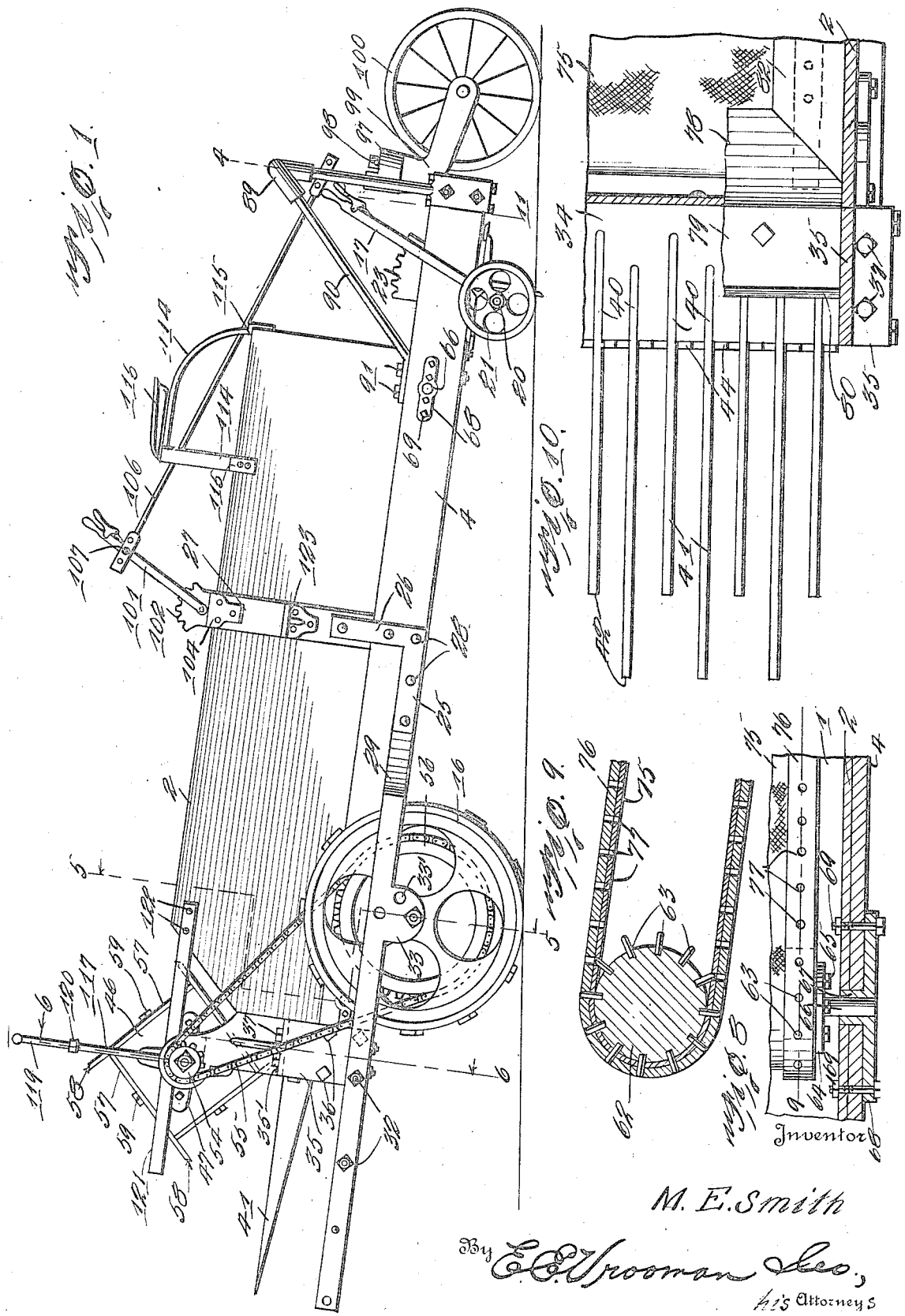
Inventor
M. E. Smith
By E. E. Vrooman Leo,
his Attorneys

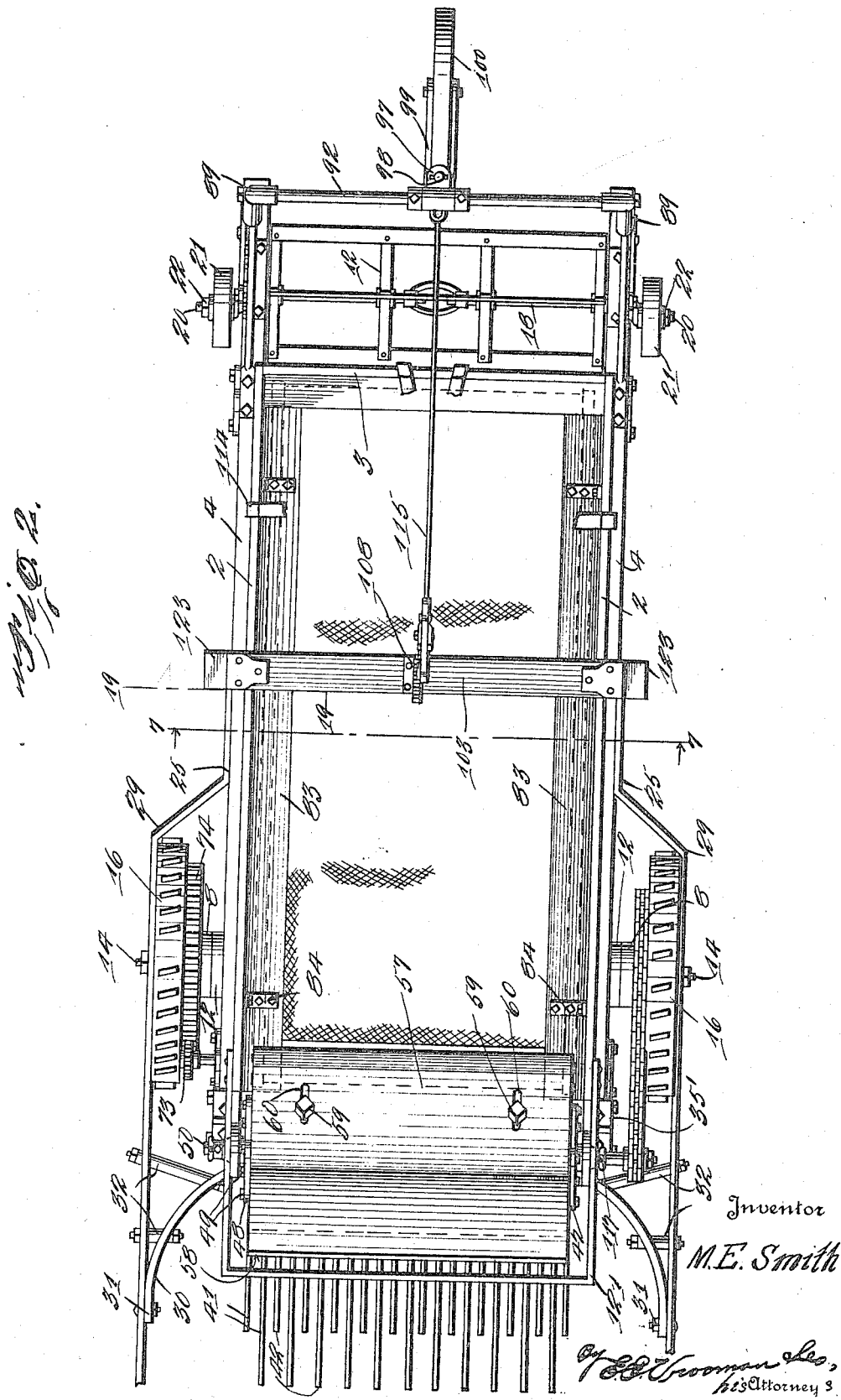

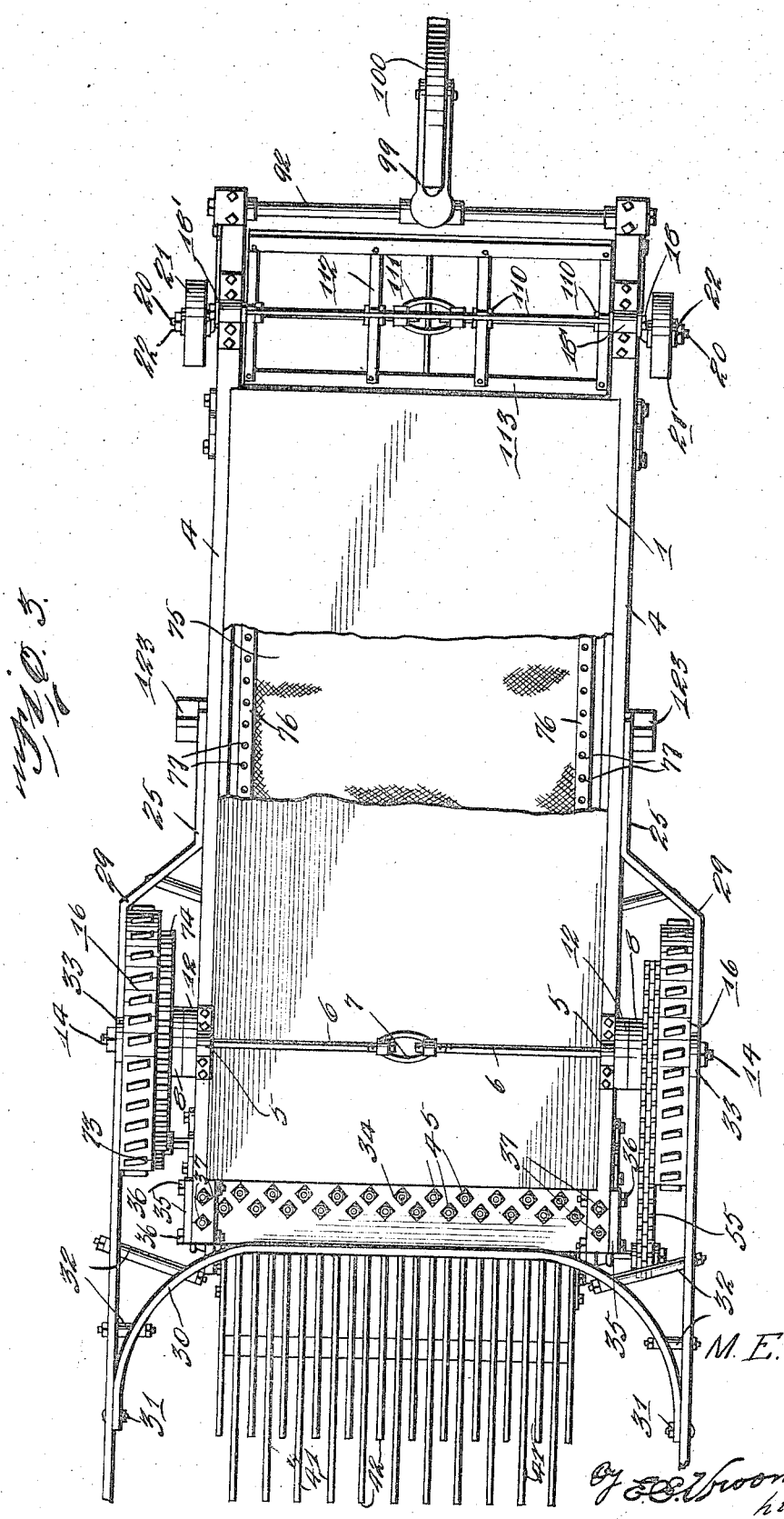

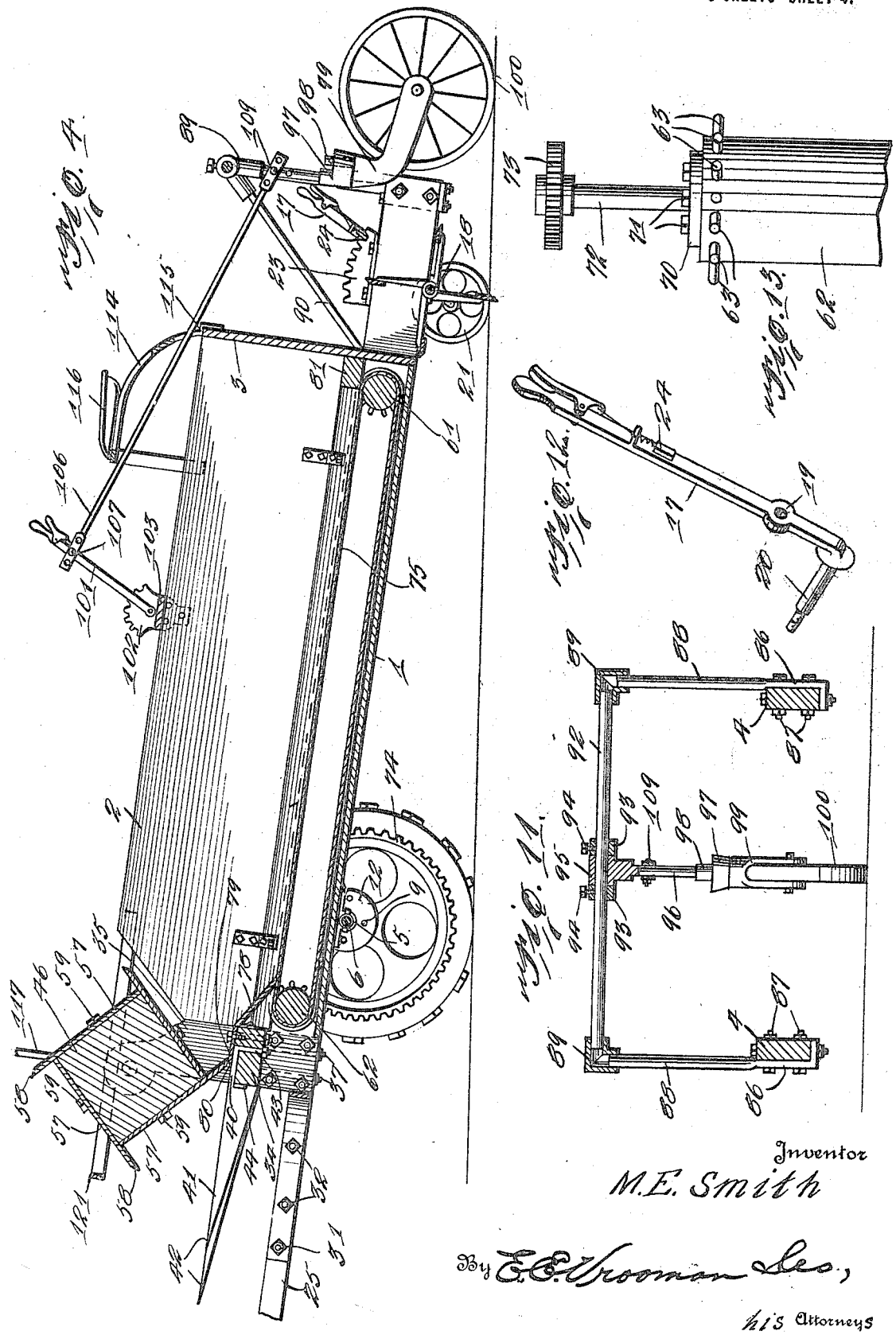

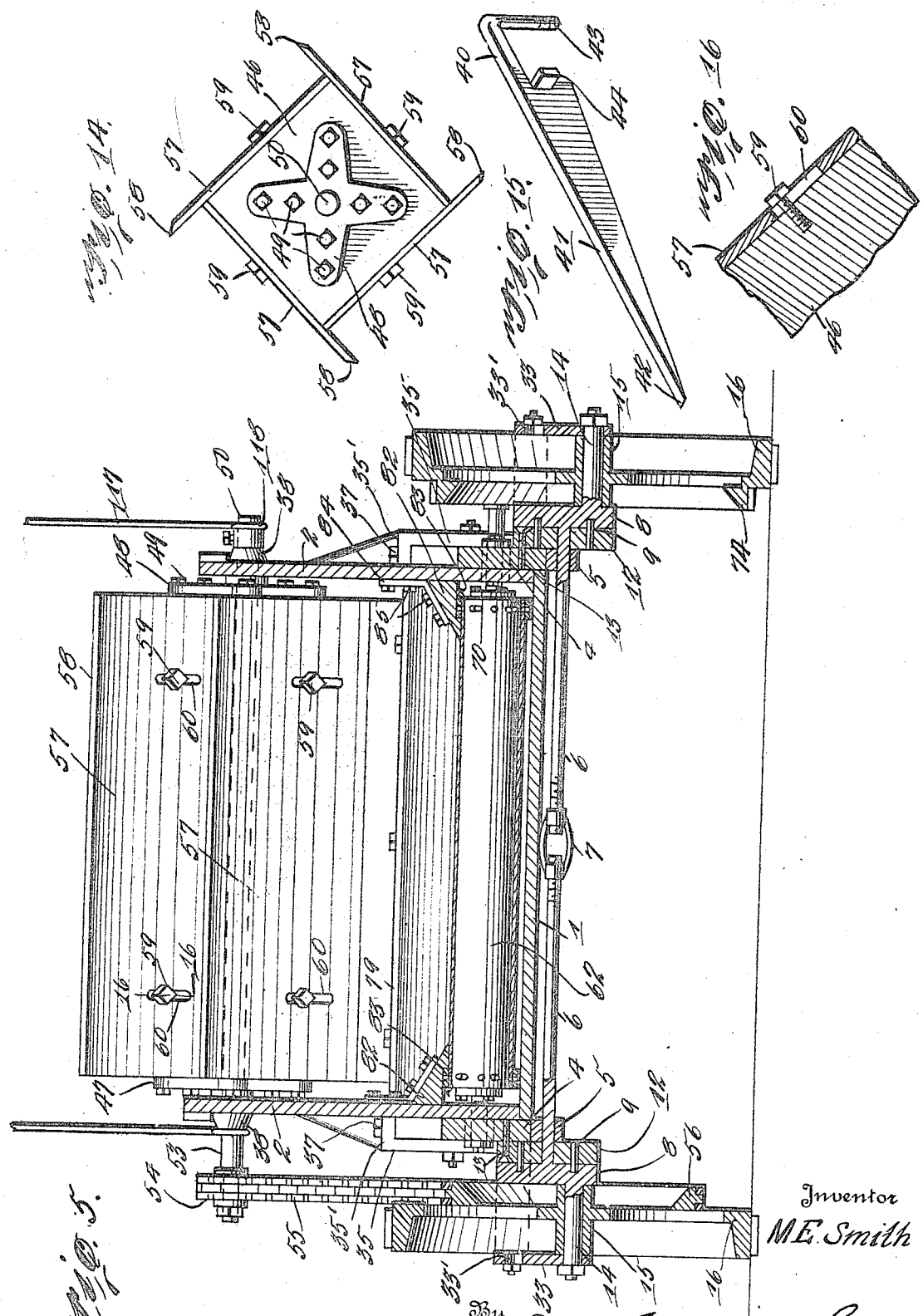

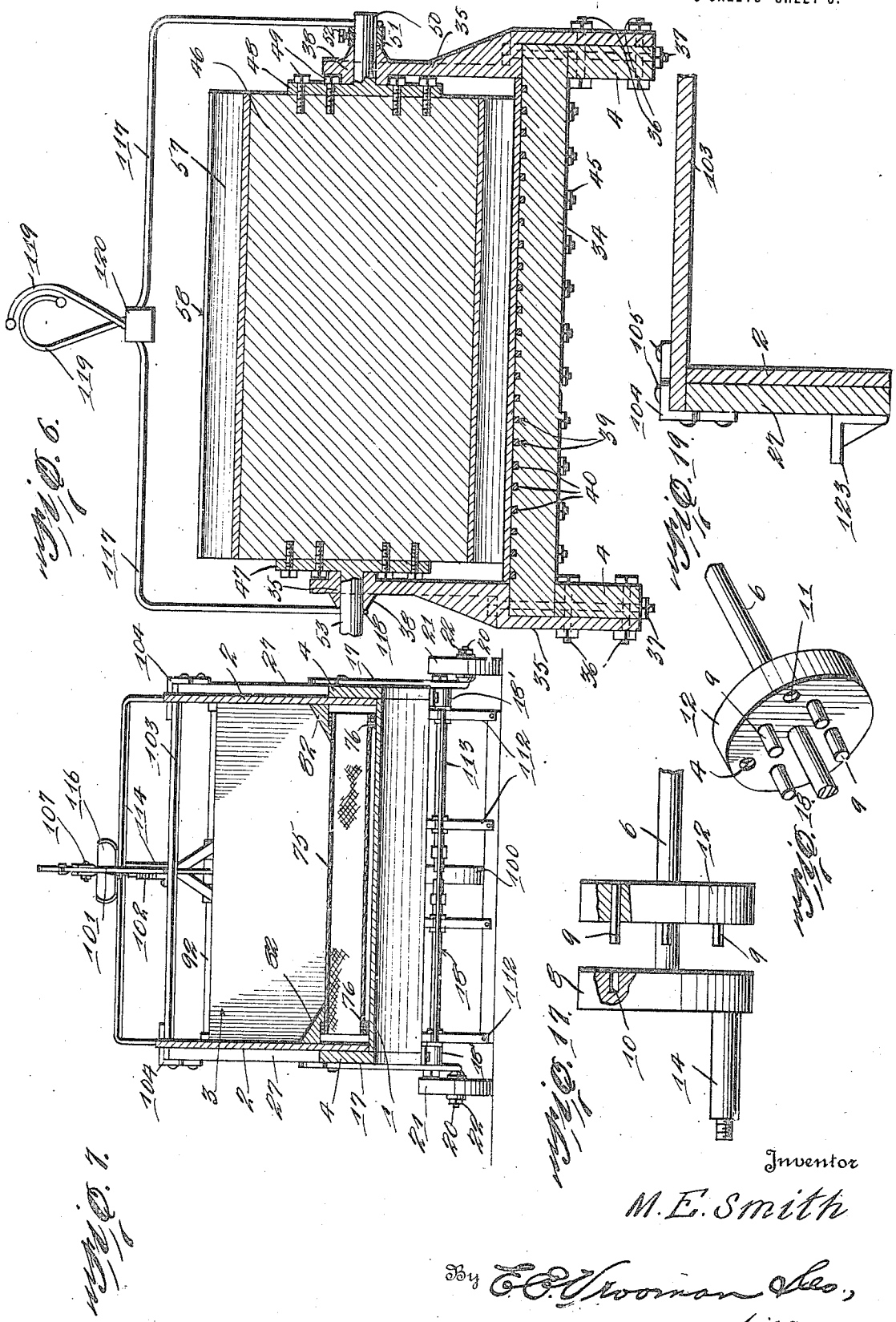

UNITED STATES PATENT OFFICE.

MILLARD ELMOR SMITH, OF ST. JO, TEXAS, ASSIGNOR OF ONE-HALF TO J. T. SIMMONS, OF MONTAGUE COUNTY, TEXAS.

COTTON-BOLL HARVESTER.

1,237,832.   Specification of Letters Patent.   Patented Aug. 21, 1917.

Application filed February 14, 1917. Serial No. 148,662.

*To all whom it may concern:*

Be it known that I, MILLARD ELMOR SMITH, a citizen of the United States of America, residing at St. Jo, in the county of Montague and State of Texas, have invented certain new and useful Improvements in Cotton-Boll Harvesters, of which the following is a specification, reference being had therein to the accompanying drawing.

This invention relates to a cotton boll harvester and has for its principal object the production of a structure which will quickly and readily strip the unopened bolls from the cotton stalks.

Another object of this invention is the production of a cotton boll harvester wherein a plurality of forks are provided which will catch the bolls and cause the same to be moved adjacent a rotary cutting knife which will readily clip the bolls from the stalks as the harvester is moved forwardly.

Another object of this invention is the production of a cotton boll harvester wherein an endless apron is employed which will receive the bolls adjacent the inner ends of the forks and move these bolls to one end of the body of the harvester.

A still further object of this invention is the production of an efficient boll harvester wherein a simple and efficient means is provided for tilting the harvester and thus tilt the forward end of the forks for permitting the cotton stalks of various heights to be readily stripped of the bolls.

With these and other objects in view, this invention consists of certain novel constructions, combinations and arrangements of parts as will be hereinafter more fully described and claimed.

In the accompanying drawings:

Figure 1 is a side elevation of the cotton boll harvester showing the same ready for use.

Fig. 2 is a top plan view of the boll harvester as constructed in accordance with this invention.

Fig. 3 is a bottom plan view of the harvester partly broken away.

Fig. 4 is a central longitudinal sectional view through the cotton boll harvester.

Fig. 5 is a vertical sectional view through the device taken on the line 5—5 of Fig. 1 looking in the direction of the arrows.

Fig. 6 is a section taken on the line 6—6 of Fig. 1, looking in the direction of the arrows.

Fig. 7 is a section taken on the line 7—7 of Fig. 2, looking in the direction of the arrows.

Fig. 8 is a fragmentary sectional view through a portion of the structure, illustrating the manner in which one end of the apron roller is supported.

Fig. 9 is a section taken on the line 9—9 of Fig. 8.

Fig. 10 is a fragmentary plan view of a portion of the forward end of the cotton harvester illustrating the arrangements of the forks.

Fig. 11 is a vertical section taken on the line 11—11 of Fig. 1.

Fig. 12 is a detail perspective view of one of the levers used for moving the caster wheels.

Fig. 13 is a plan view of one end of one of the apron rollers.

Fig. 14 is an elevation of one end of the rotary knife.

Fig. 15 is a detail perspective view of one of the forks.

Fig. 16 is a section taken on the line 16—16 of Fig. 5.

Fig. 17 is an elevation partly in section of a portion of the main supporting axle and connection therefor, illustrating how the boll wheels are adjustably mounted upon the harvester.

Fig. 18 is a detail perspective view of one end of the main axle.

Fig. 19 is a section taken on the line 19—19 of Fig. 2.

Referring to the accompanying drawings by numerals, it will be seen that 1 designates the bottom of the body of the harvester upon which the sides 2 and the rear end 3 are fixedly mounted so as to form a hollow body for receiving the bolls which are stripped by the harvester. The longitudinal side beams 4 are mounted upon the body of the harvester and upon these beams 4, adjacent the forward end are carried the journals 5 through which the sectional main axle 6 extends. This axle has a turn-buckle 7 to connect its inner ends for assisting in holding the axle against accidental movement and in a rigid condition. A block 8 is fixedly mounted upon the outer end of each section of the main axle 6 and this block 8 has the pins 9 extending outwardly therefrom. This block is also provided with recesses 10 which will receive the pins 11 carried by the block 12 which is also mounted upon the main axle 6, being held against movement by means of the screws 13 which pass through each block 12 and engage the side beams 4. Stub-axles 14 extend outwardly from each block 8 as shown clearly in Fig. 5, so as to receive the hub 15 of the drive wheel 16. When the harvester is in operation, the blocks 8 will fit snugly upon the fixed blocks 12 so as to cause the pins 11 to extend into the recesses 10 while the pins 9 will extend into the blocks 8, whereby the blocks 8 will be held against accidental movement. It will be seen, however, that when it is desired, the blocks 8 will be moved from engagement from the blocks 12 so as to allow the pins to fit within the selected openings, whereby the height of the harvester body or the distance the same is supported from the ground may be adjusted inasmuch as the stub-axles 14 are carried upon the blocks 8 off-center which will consequently cause the adjustment of these blocks 8 upon the blocks 12 to increase or shorten the height of the harvester body. In this manner, it will be seen that the forward end of the cotton boll harvester is adjustably and positively supported.

The levers 17 have a securing rod 18 passing through their bodies 19 so as to pivotally support the levers 17 at points adjacent the rear ends of the beams 4. This rod 18 is held upon the side beams 4 by the clamps 18' as shown in Fig. 3. These levers 17 also have stub-axles 20 at their lower ends upon which the wheels 21 are rotatably supported being retained thereon by the nuts 22. It will be seen that each beam 4 is provided with a rack 23 engaged by the spring pawl 24 of the lever 17, whereby the levers will be positively retained in set positions upon the rear ends of the beams 4. It will be seen by referring particularly to Fig. 4 that when the levers are slanting rearwardly, the rear end of the harvester will be in its lowest position, although upon swinging the levers 17 to vertical position, the height of the rear end of the harvester will be considerably increased and in this manner, it will be seen that the rear end of the harvester is capable of being vertically adjusted with respect to the ground.

The side bars 25 have the forwardly extending ends 26 which fit upon the standards 27 carried upon the sides 2 of the harvester body. These bars 25 are permanently secured upon the beams 4 and the standards 27 by means of the bolts or other securing members 28 and these bars then extend outwardly as indicated at 29 so as to pass upon the outer sides of the drive wheels 16. A reinforcing bar 30 is curved throughout its entire length and has its ends secured as indicated at 31 to the bars 25 adjacent their forward ends for holding these bars in spaced relation. It will also be seen that the bars will be further reinforced by means of the spacing bolts 32, thereby forming a comparatively rigid frame upon the forward end of the harvester body. The forward ends of the bars 25 are adapted to carry swingletrees which are not thought necessary to herein disclose, so as to permit draft animals to be harnessed to the swingletrees for drawing the harvester forwardly. It should be noted that the bars 25 are provided with depending portions 33 having openings 33' formed therein, which openings 33' are adapted to receive the outer ends of the stub-axles 14 as shown in Fig. 5, whereby the outer ends of the stub-axles will be set and the bars 25 will be held from spreading when in operation. By providing several of the openings 33', it will be seen that the depending portions 33 of the bar 25 will provide for the adjustment of the blocks according to the movement of the blocks upon each other when it is desired to change the adjustment of the forward end of the harvester body.

In order to gather the bolls to such a position as to permit the same to be severed by the rotating knife a sill 34 has its ends mounted upon the beams 4, as shown clearly in Fig. 6. Brackets 35 are bolted as indicated at 36 upon the beams 4 and these brackets have shoulder portions 35' which fit upon the upper portions of the sill 34, adjacent its ends, thereby allowing the bolts 36 to be passed through the shoulder 35' downwardly through the sill 34 and the beams 4 so as to receive the nuts 37, whereby the sill will be fixedly mounted upon the beams 4. These brackets 35 project upwardly and are provided with hub portions 38 for purposes to be hereinafter set forth. The sill 34 is provided with a plurality of grooves 39 formed therein which receive the shanks 40 of the forks 41. The construction of the forks 41 is clearly shown in Fig. 15 and it will be seen that these forks 41 are comparatively broad adjacent their rear ends and taper to the forward pointed ends 42. The reduced shank 40 of each fork 41 has a depending threaded bolt portion 43 formed at a distance from the outwardly extending abutting lug 44 formed upon the fork 41. These shanks 40 fit within the grooves 39 as shown in Fig. 6, so as to allow the bolt portion 43 of the fork to pass through the sill 34 as shown in Fig. 4, whereby nuts 45 may be applied to the projecting lower ends of these bolt portions 43 for fixedly holding the forks upon the sill 34. At this time, it will be seen by referring particularly to Fig. 4, that the lugs 44 of the forks 41 will be bearing against the forward face of the sill 34 for resisting the inward movement of the forks while by having the shanks 40 fit within the grooves 39 of the sill 34, the forks will be held against lateral movement. It will be further noted by referring particularly to Fig. 10 that the alternate forks are longer than the intermediate forks and the shanks of the longer forks are made longer than the shanks of the shorter forks, thereby allowing the longer forks to be more steadily secured than if the shanks were of the same length as the shorter forks, since the longer shanks by fitting upon the wheel will provide a greater fulcrum for holding the longer forks after the nuts 45 have been applied thereto. These forks 41 project for a considerable distance beyond the forward end of the harvester body and as a consequence will pass between the stalks of the cotton bushes, whereby the bolls will be held upon the forks although the loose stalks may slip between the forks. It is intended to have these forks of such a width and spaced at such a distance apart as to positively hold the unopened bolls, although the loose or opened bolls or loose stalks will readily slip between the forks without being retained so as to be severed by the rotary cutting knife.

An elongated squared block 46 which constitutes a portion of the rotary knife has plates 47 and 48 secured by the bolts or screws 49 upon its end portions. The plate 48 has a comparatively short stub-axle 50 projecting through one of the hubs 38 of one of the brackets 35 as shown in Fig. 6. A collar 51 having a set screw 52 is permanently secured upon the stub-axle 50 adjacent its outer end so as to assist in holding the stub-axle against movement through the hub 38. The plate 47 is provided with a comparatively long stub-axle 53 as shown in Fig. 5 and upon this stub-axle 53 there is carried a fixed pinion 54. An endless chain 55 passes around this pinion 54 and also passes around the gear wheel 56 which is fixedly mounted upon one of the drive wheels 16 as shown in Fig. 5. Thus, it will be seen that as the harvester is moved forwardly, a rotary motion is imparted to the gear wheel 56 by means of the drive wheel 16 and the chain will pass around the pinion 54 and owing to the relative size of the pinion 54 with respect to the gear wheel 56, it will be seen that the pinion 54 will impart very rapid rotary motion to the stub-axle 53, thereby causing the elongated squared block 46 of the cutting knife to be very rapidly rotated. The blade 57 rests evenly upon the flat surfaces of the elongated squared block 46 and these blades 57 which have cutting edges are held in adjusted set position by means of the screws 59 which pass through the slots 60 and these blades 57 as shown in Figs. 5 and 16, which set screws 59 engage the squared block 46. As the cutting edges 58 of the blades 57 project for a considerable distance beyond the side surfaces of the elongated squared block 46, it will be seen that they are in position to readily sever the cotton bolls which may come into the path of movement of the cutting edges. The rotary cutting knife is therefore rotatably mounted upon the upper ends of the brackets 35 directly above the inner ends of the forks 41. As a consequence, when rotary motion is imparted by means of the gear wheel, chain and pinion to the square elongated block 46 and the blades are therefore moved in a circular path, it is intended to have the cutting edges 58 of these blades 57 extend or move adjacent the inner ends of the forks 41 as shown in Fig. 5, whereby the bolls which are gathered move rearwardly along the fork and will move into alinement with the path of travel of the cutting edges of the blades 47 and as a consequence will be quickly and rapidly severed from the stalks of the cotton bushes, thereby allowing these stalks to readily slip from between the forks without being severed by the rotary cutting knife.

A loose roller 61 is mounted upon the body of the harvesting machine adjacent its rear end as shown clearly in Fig. 4 at a spaced distance from the roller 62 carried within the body of the cotton harvester upon its forward open end. These rollers are carried above the bottom 1 and are provided with pins 63 adjacent their ends as shown clearly in Figs. 9 and 13. These rollers 61 and 62 have plates 64 bolted as shown at 65 in Fig. 8 from which project the stub-shafts 66. The bushing 67 is mounted upon the retaining plate 68 which is bolted as shown at 68 to one of the sides 2 of the body of the cotton harvester, whereby the ends of the rollers 61 and 62 will be firmly supported upon the body of the cotton harvester. The plate 70 mounted upon one end of the roller 62 by means of the screws or bolts 71 has an elongated shaft 72 extending therefrom which also has a pinion 73 keyed upon its outer end. This pinion 73 meshes with the gear wheel 74 permanently mounted upon the remaining drive wheel 16, whereby as rotary motion is imparted to the gear wheel 74, the pinion will be caused to rotate very rapidly because of this meshing engagement with the gear wheel, thus causing the roller 62 to be rapidly revolved. The endless apron 75 passes around the rollers 61 and 62 as shown most clearly in Fig. 4 so that as rotary motion is imparted by means of the engagement of the gear wheel 74 and pinion 73 to the roller 62, the endless apron 75 will be moved around the rollers. In order to prevent this apron 75 from slipping, however, reinforcing strips of leather or other suitable material 76 are secured in any suitable manner upon the endless apron adjacent its side edges as shown clearly in Figs. 8 and 9. This endless apron 75 and the reinforcing strips 76 are provided with registering openings 77 into which the pins 63 of the rollers 61 and 62 pass as the rollers are rotated, as shown clearly in Fig. 9. Therefore, it will be seen that when the roller 62 is rotated, the passing of the pins 63 into the opening 77 will positively hold the apron from slipping upon the rollers and as a consequence will cause the apron to move therearound toward the rear end of the harvester body.

In order to prevent the cotton bolls which have been moved by means of the forks to a position to be severed by the rotating knife from falling over the side edges of the endless apron or from passing down under the endless apron around the rollers, there is provided a protector plate 78 as shown in Fig. 4. This plate 78 is carried adjacent the plates 79 upon the sill 34 and this plate 79 has a beveled edge 80 against which the cutting edges 58 of the blades 57 will slightly bear so as to cause the severance of the bolls which are gathered by the forks. The protector plate 78 extends downwardly so as to terminate at a point adjacent the upper surface of the endless apron 75 as shown in Fig. 4. Therefore, as the bolls are severed by the blades 57, it will be seen that the flat surfaces of the cutting knife will strike the bolls so as to throw the same along over the guard plate 78 causing the bolls to fall upon the moving endless apron. This apron 75 will then move the bolls to the inner ends of the body of the harvester, although the bolls will be prevented from passing over and around the inner roller 61 inasmuch as the cleat 81 is fixedly mounted upon the inner end 3 of the body of the harvester at such a point as to limit the inward movement of the bolls as the same are conveyed inwardly upon the apron 75. Guard strips 82 are also positioned within the body of the cotton harvester so as to overhang the endless apron 75 at points adjacent its side edges. These guard strips 82 are cut away upon their lower portions as shown at 83 so as to permit sufficient space for the accommodation of the reinforcing strips 76 carried upon the side edges of the endless apron 75. These guard strips 82 are secured in position by means of the hanger brackets 84 which are bolted to the sides 2 of the harvester body and also to the upper portion of each strip 82 as shown at 85. Since the upper surfaces of these guard strips 82 are slanting downwardly toward the endless apron 75, it will be seen that the bolls which may pass on to the upper surfaces of either guard strip 82 and will be directed on to the apron toward the center thereof. Thus it will be seen that by the provision of the guard plate 78, the guard strips 82 and the cleat 81, the bolls will be positively retained in the harvester body and be prevented from clogging or preventing the efficient operation of the apron 75.

The angular plates 86 are bolted as indicated at 87 upon the side beams 4 adjacent their rear ends and these angular plates 86 have vertical standards 88 extending upwardly therefrom. The upper ends of these standards 88 pass into the joints 89 while the slanting braces 90 are also carried by these joints 89 and have their lower ends permanently secured by means of the bolts 81 to the side beams 4 as shown in Fig. 1, while these joints carry the ends of the rods 92 as shown in Fig. 2. The collars 93 are retained in set position by means of the screws 94 in spaced relation upon the rods 92 at a point adjacent the center thereof as shown in Fig. 11. The sleeve 95 is loosely mounted upon the rods 92 between the collars 93 and this sleeve 95 has a stem 96 depending therefrom. The stem 96 carries a journal 97 into which the bearing 98 of the yoke 99 of the "crazy wheel" 100 extends. By having the journal 98 extending into the bearing 97, it will be seen that the wheel 100 may swing to either side as desired. Under normal conditions, this wheel 100 is allowed to ride upon the surface of the ground but is not in use for as shown in Fig. 4, it is in an inoperative position. When, however, it is desired to turn the harvester at the end of a row at which time it is necessary to make a turn in a minimum amount of space, the operator shifts the lever 101 forwardly. This lever 101 is forwardly mounted upon the rack 102 which rack 102 is fixedly mounted upon the slat 103 carried upon the upper edges of the sides 2 as shown in Figs. 2, 4 and 19 and also upon the upper ends of the standards 27. A clip 104 is screwed or otherwise secured as indicated at 105 upon the slat 103 and upon the upper end of the standards 27 at the ends of the slat for fixedly retaining this slat upon the upper portion of the harvester body. A link 106 is secured by means of a bolt 107 to the lever 101 which lever 101 is adjustably mounted by means of a spring pressed pawl 108. It will be noted by referring particularly to Fig. 4 that the end of the link 106 is adjustably mounted upon the lever 101 for allowing the adjustment of the lever with respect to the link when so desired. The opposite end of this link 106 is also adjustably mounted as shown at 109 upon the stem 96. When it is desired to turn the harvester at the end of the row or when the harvester is being moved from place to place, the lever 101 is swung forwardly by the operator of the harvester, thus causing the link 106 to draw forwardly upon the stem 96. This action will swing the stem 96 forwardly and pivot the sleeve 95 upon the rod 92, thereby moving the wheel 100 to a point under the rod 92, whereby the weight of supporting the inner end of the harvester will be taken up by the wheel 100. Since the mounting of the yoke 99 upon the stem 96 is such to allow the wheel 100 to swing laterally when necessary, it is obvious that a very short turn may be made with the harvester.

After the bolls have been stripped from the stalks of the bushes, the bushes are then of no further use and consequently it is very desirable to have the same cut down. In order to accomplish this function, the hubs 110 are loosely mounted upon the bolt 18 as shown in Fig. 3. This bolt 18 is sectional and has its inner end connected by means of the turn-buckle 111. Therefore, when it is so desired, the turn-buckle may be turned so as to release the ends of the sectional bolt 18, thus allowing the bolt to be withdrawn so as to permit the hubs 110 to be removed from engagement with the two sections of the bolt. The fingers 112 are fixedly carried upon the hubs 110 and these fingers 112 have elongated blades 113 fixedly mounted upon their outer ends. Therefore, when the harvester is operating in the position indicated in Figs. 1 and 4, it will be seen that the wheels 21 are moved to such a position as to allow the blades 113 to project and extend in a plane below the plane of the lower portions of the wheels 21. As a consequence, the blades will partially pass into the ground for it will be seen that it is impossible for these blades to withhold or support the weight of the harvester. After the bolls have been severed from the stalks of the cotton bushes, these stalks will pass back under the harvester as the harvester moves thereover. The blades of the stalk cutter will, however, come into engagement with these stalks as the stalks move from under the rear end of the harvester body and will swing these stalks downwardly into the ground and then sever the stalks. This same operation will continue as long as the stalk cutter is permitted to rotate, whereby the stalks may be readily cut down after the bolls have been removed therefrom. As above explained, however, it is of course, obvious that by the movement of the lever 17, the caster wheels may be moved to a position which will prevent the stalk cutter from coming into severing engagement with the stalks or if desired, the wheel 100 may be drawn to extend in a plane beneath the rod 92, thus preventing the stalk cutter from severing the stalks or the wheels 21 from rotating upon the ground.

It is obvious that the arms 114 may fit upon the upper edges of the sides 2 and end 3 as indicated at 115 so as to be held against accidental displacement while the seat 116 may be positioned upon the arms 114 for being easily supported above the harvester body in a position to permit the operator of the machine to operate the raising and lowering of the machine and at the same time direct the draft animals which are to be attached to the forward end of the harvester.

The strands 117 have their ends looped as indicated at 118 upon the stub-axles 50 and 53 and are secured thereto so as to extend in a vertical plane. The inner ends of these strands 117 are provided with spaced loops 119, which are arranged in a fixed position by means of the lock 120. These strands extend for a considerable distance above the upper portions of the rotary cutting knife and as a consequence, the operator may place his lines or reins easily within the loops 119 and owing to their spaced relation as shown in Fig. 6, will cause the lines to be held from accidental injury by the rotary cutting knife in such a manner as to allow the operator to easily direct the draft animals by means of the lines. Furthermore in order to prevent the rotary cutting knife from accidental gathering the stalks and cutting the same before the bolls have been stripped, a rectangular frame 121 passes around the forward portion of the rotary cutting knife as shown clearly in Figs. 1 and 2 and this rectangular frame 121 will be permanently retained upon the body of the harvester 122 as indicated for preventing the downward sweep of the cutting edge of the rotary cutting knife from gathering the stalks and cutting the same after allowing the same to pass through the forks.

It is of course, obvious that the standards 27 may be provided with steps 123 for assisting the operator in mounting to the upper portions of the harvester and thus gain access to the seat 116.

In the stripping of the stalks of the cotton bolls, it is generally necessary to do so by hand but by the employment of the cotton harvester as above set forth, it will be seen that the stalks may be mechanically stripped of the bolls very rapidly. Draft animals are attached to the forward end of the bars 25 of the cotton harvester. The cotton harvester is then drawn around and the forks will pass between the stalks and thus cause the bolls to pass to a point adjacent the guard plate 17 at the inner ends of the forks. The movement of the drive wheels 16 will cause the endless apron to be moved and the rotary knife to be revolved. When the bolls come into the path of travel of the cutting edges, the bolls will be quickly severed from the stalks and thrown rearwardly on to the moving apron and the bolls will be conveyed by the moving apron to the inner portions of the harvester body. It is of course obvious that as soon as the body is filled to a desired depth, it may be emptied into any suitable conveyance and then the operation of the cotton boll harvester may be continued. While the bolls are being stripped from the stalks, the caster wheels may be moved so as to allow the blades to engage the stalks and cut the same, thus mowing the field as well.

From the foregoing description it will be seen that a very simple and efficient cotton boll harvester has been provided which is constructed so as to rapidly and positively strip the stalks of the cotton bolls and then sever the same, performing this operation as long as the harvester is moving and at a minimum expense.

What is claimed is:

1. In a device of the class described, the combination of a body, means for supporting said body, a sill carried by said body, said sill having a plurality of grooves, forks comprising elongated bodies having shanks formed upon their inner ends, said shanks terminating in depending bolts, said forks also having laterally extending lugs, said lugs bearing upon the forward edge of said sill, said bolts passing through said sill whereby said forks will be held against accidental displacement, and a rotary knife having cutting edges carried adjacent said forks whereby cotton bolls gathered by said forks may be cut from the stalks by the operation of said knife.

2. In a device of the class described, the combination of a body, forks carried by said body, said forks being adapted to gather the cotton bolls and move the same to a point adjacent the forward end of said body, a rotary knife comprising a squared elongated block, means for rotating said block, blades positioned upon said block, and means for holding said blades in an adjusted position, said blades being adapted to move adjacent said forks for severing bolls gathered thereby, the flat sides of said blades being adapted to strike the severed bolls for throwing the same into said body.

3. In a device of the class described, the combination of a body having forward and rear end portions, gathering means carried by said body, severing means carried by said body adjacent said gathering means, a frame carried upon the rear end portions of said body, a rod carried by said frame, a sleeve rotatably mounted upon said rod, a stem carried by said sleeve, a bearing carried upon the lower end of said stem, a yoke having a journal extending into said bearing whereby said yoke is pivotally supported, a wheel carried by said yoke, means for moving said stem forwardly and rearwardly whereby upon the movement of said stem said wheel will raise and lower the rear end portion of said body thereby working said gathering means at different heights.

4. In a device of the class described, the combination of a body, means for supporting said body, a sill carried by said body, forks comprising bodies having shanks formed upon their inner ends, said forks terminating in bolts, laterally extending lugs formed upon the inner ends of said last-mentioned bodies, said lugs fitting upon the front of said sill and said bolts projecting through said sill, means engaging said bolts for holding the same against displacement whereby said forks will be held firmly upon said sill, and cutting means carried adjacent said forks.

5. In a device of the class described, the combination of a body, means for supporting said body, a sill carried by said body, said sill having grooves formed therein, forks comprising bodies having shanks formed upon their inner ends, said shanks terminating in depending bolts, laterally extending lugs formed upon the inner ends of said last-mentioned bodies, said lugs bearing upon the front of said sill, said shanks fitting within said grooves, said bolts projecting downwardly below said sill, securing means connected to the projecting end of said bolts, whereby said bolts will be held against displacement, thereby firmly holding said forks upon said sill, and cutting means carried adjacent said forks.

In testimony whereof I hereunto affix my signature.

MILLARD ELMOR SMITH.